United States Patent [19]

Meschenmoser

[11] Patent Number: 5,650,047
[45] Date of Patent: Jul. 22, 1997

[54] PRESSING DEVICE FOR A PRESSING ROLL

[75] Inventor: Andreas Meschenmoser, Horgenzell, Germany

[73] Assignee: Voith Sulzer Papiermaschinen GmbH, Heidenheim, Germany

[21] Appl. No.: 540,172

[22] Filed: Oct. 6, 1995

[30] Foreign Application Priority Data

Oct. 7, 1994 [DE] Germany ............... 44 35 845.8

[51] Int. Cl.$^6$ ............................................. D21F 3/02
[52] U.S. Cl. ................... 162/358.3; 162/361; 492/7
[58] Field of Search ............... 162/358.3, 358.5, 162/361; 492/7

[56] References Cited

U.S. PATENT DOCUMENTS

| | | | |
|---|---|---|---|
| 4,643,802 | 2/1987 | Schiel | 162/358.3 |
| 4,917,768 | 4/1990 | Ulmarinen | 162/358.3 |
| 5,223,100 | 6/1993 | Schiel et al. | 162/358.3 |

FOREIGN PATENT DOCUMENTS

| | | | |
|---|---|---|---|
| 0345501 | 12/1989 | European Pat. Off. | |
| 3317457 | 11/1984 | Germany | 162/358.3 |

*Primary Examiner*—Karen M. Hastings
*Attorney, Agent, or Firm*—Greenblum & Bernstein P.L.C.

[57] ABSTRACT

A pressing roll for the production or treatment of web or band shaped materials, particularly fiber webs or bands, with the roll jacket of the pressing roll being rotatably arranged about a carrier and journalled via a pressing device, with the pressing device having at least one support element that includes at least one supporting pressing element acting in the direction of a pressing area and being supported on the carrier, with the at least one support element being displaceable in the circumferential direction as well as being radially movable relative to the pressing element and which, in the circumferential direction, is supported on a spacer on a limit stop, attached to the carrier, via at least one spacer, the spacer permitting a radial movement relative to the limit stop in the transition between an unloaded and a loaded condition of the support element at a substantially fixed support point of the spacer at the limit stop or at the support element, with a low friction support, in the circumferential direction, being assured at the limit stops particularly during the loaded condition, via a spacer that permits at least a minimal radial movement during the loaded condition of the support element at a constant support point of the spacer at the limit stop and at the support element.

27 Claims, 2 Drawing Sheets

PRESSING DEVICE FOR A PRESSING ROLL

CROSS REFERENCE TO RELATED APPLICATIONS

This application claims the priority of German Application No. P 44 35 845.8, filed Oct. 7, 1994, the disclosure of which is incorporated herein by reference in its entirety.

BACKGROUND OF THE INVENTION

1. Field of the Invention

This invention pertains to a pressing roll having a roll jacket, the roll jacket being rotatably arranged about a carrier and journalled via a pressing device, wherein the pressing device is comprised of at least one support element, the support element including at least one supporting pressing element acting in a direction of a pressing area and being supported on the carrier, with the at least one support element being displaceable in the circumferential direction as well as being radially movable relative to the pressing element, with the at least one support element, in the circumferential direction, being supported relative to a limit stop, attached to the carrier, via at least one spacer, the spacer permitting a radial movement relative to the limit stop during the transition between an unloaded and a loaded condition of the support element, at a substantially fixed support point of the spacer at at least one of the limit stop and the support element, which is utilized during the production or treatment of band-shaped materials, particularly fiber webs or bands.

2. Discussion of the Background of the Invention and Material Information

Pressing rolls of this type are set forth, for example in European Patent Publication EP 0 345 501 wherein, for the support of the support element, a support bearing, having rolling elements, is utilized, wherein the support bearing is affixed to the support element and supported on a limit stop affixed to a carrier.

This is deemed to ensure a low friction support of the support element in the circumferential direction. This is of importance since strip-shaped support elements, in particular, due to thermally induced distortion, allow support of the limit stop at only a few points which, due to the enormous friction, limits the freedom of movement of the support element in the radial direction. In order, for example, to compensate for thickness variations within the material web or other webs that are conveyed through the press gap, a radial movement of the support element, even if small, that is not encumbered with additional friction, becomes of importance.

The noted solution still has unsolved problems with reference to ensuring satisfactory guidance of the rolling element bodies for the avoidance of frictional engagements or jamming.

It is therefore the task or object of this invention to assure, for the pressing rolls, a safe, simple, low friction support, in the circumferential direction, at the limit stops particularly during the loaded condition.

SUMMARY OF THE INVENTION

This task or object is achieved in a first embodiment of this invention via a pressing roll having a roll jacket, the roll jacket being rotatably arranged about a carrier and journalled via a pressing device, wherein the pressing device is comprised of at least one support element, the support element including at least one supporting pressing element acting in a direction of a pressing area and being supported on the carrier, with the at least one support element being displaceable in the circumferential direction as well as being radially movable relative to the pressing element, with the at least one support element, in the circumferential direction, being supported relative to a limit stop, attached to the carrier, via at least one spacer, the spacer permitting a radial movement relative to the limit stop during the transition between an unloaded and a loaded condition of the support element, at a substantially fixed support point of the spacer at at least one of the limit stop and the support element, wherein the spacer permits at least a minimal movement of the support element relative to the limit stop in the loaded condition of the support element at the constantly remaining support point of the spacer at the limit stop and at the support element.

In a further embodiment of the pressing roll of this invention, the spacer is received, in part, in a recess in one of the support element and the limit stop, with the recess permitting a movement therewithin of the spacer.

In another embodiment of this invention, the spacer is substantially rod-shaped.

In a differing embodiment of this invention, the spacer is comprised of a rigid material.

In yet a further embodiment of this invention, the spacer is comprised of an elastic material.

In yet another embodiment of this invention, the recess is in the form of a bore, with the diameter of the bore being greater than the diameter of the rod-shaped spacer.

In yet a differing embodiment of this invention, the rod-shaped spacer is non-rotatably supported in the recess that serves as the bore.

In still a further embodiment of this invention, the rod-shaped spacer is retained, in a centered manner, via at least one highly elastic adjusting element in the recess, in an unloaded condition.

In still another embodiment of this invention, the support element has a concavely shaped support area for the formation of an elongated press gap with a circular cylinder mating roll and wherein the roll covering comprises a flexible, impermeable band.

In still a differing embodiment of this invention, the support element, in the axial direction, is strip-shaped and is supported by a plurality of pressing elements.

In that the spacer permits at least a small radial movement of the support element, relative to the limit stop, in the loaded state or condition, at a fixedly-remaining support point of the spacer at the limit stop and of the support element, a low friction or frictionless support or restraint of the support element at the limit stop, in the circumferential direction, can be assured in a simple manner in that the support element is displaceable in the circumferential direction and in the radial direction starting at the pressing element, even in the loaded condition.

The loaded state or condition, that is the pressing of the roll covering or jacket against the mating or opposing roll, is of critical importance since, due to the rotation of the rolls, a force component occurs in the circumferential direction that acts on the position or location of the support element and must be absorbed by the limit stop.

The spacer should, in part, be located in a recess in the support element or in the limit stop which permits a movement of the spacer therewithin.

In order to achieve the simplest possible form or shape it is recommended that the spacer be rod-shaped and that the recess be in the form of a bore whose diameter is greater than the diametral extent of the rod-shaped spacer. In the instance where the rod-shaped spacer is comprised of rigid material, this allows a relative movement of the support element, with reference to the limit stop, via the swinging or oscillating of the rod-shaped spacer within the recess, in the shape of a bore, without a change of support points at the support element and at the limit stop.

In the instance where the spacer is however elastic, the mobility between the limit stop and the support element is ensured via the deformation of the rod-shaped spacer within the recess.

Independent of the type of material of the spacer, the support point of the spacer, within the recess, should be so determined or set, that a movement, that is a deformation or bending or oscillation of the spacer, is possible within the recess.

In order to ensure as defined a position of the spacer as possible, after the transition from the unloaded to the loaded state of the support element, it is advantageous that the rod-shaped spaces be held about centrally axially in the loaded state, via at least one highly elastic adjusting element, so that it will be possible, in the loaded state, to achieve a movement in and against the pressing directions without causing a change of the support point of the spaces at the limit stop.

This invention is preferably utilized when the support element, for the formation of an elongated press gap with circular cylindrical mating roll, has a concavely-shaped support surface, is strip-shaped in the axial direction, as well as being supported or retained via a plurality of pressing elements and wherein the roll covering is the form of a flexible, impervious band.

BRIEF DESCRIPTION OF THE DRAWINGS

The invention which is set forth with reference to two embodiments thereof will be better understood and objects other than those set forth above will become apparent when consideration is given to the following detailed description thereof. Such description makes reference to the annexed drawings wherein throughout the various figures of the drawings, there have generally been used the same reference characters to denote the same or analogous components and wherein.

DETAILED DESCRIPTION OF THE PREFERRED EMBODIMENTS AND BEST MODE

Figure 1:
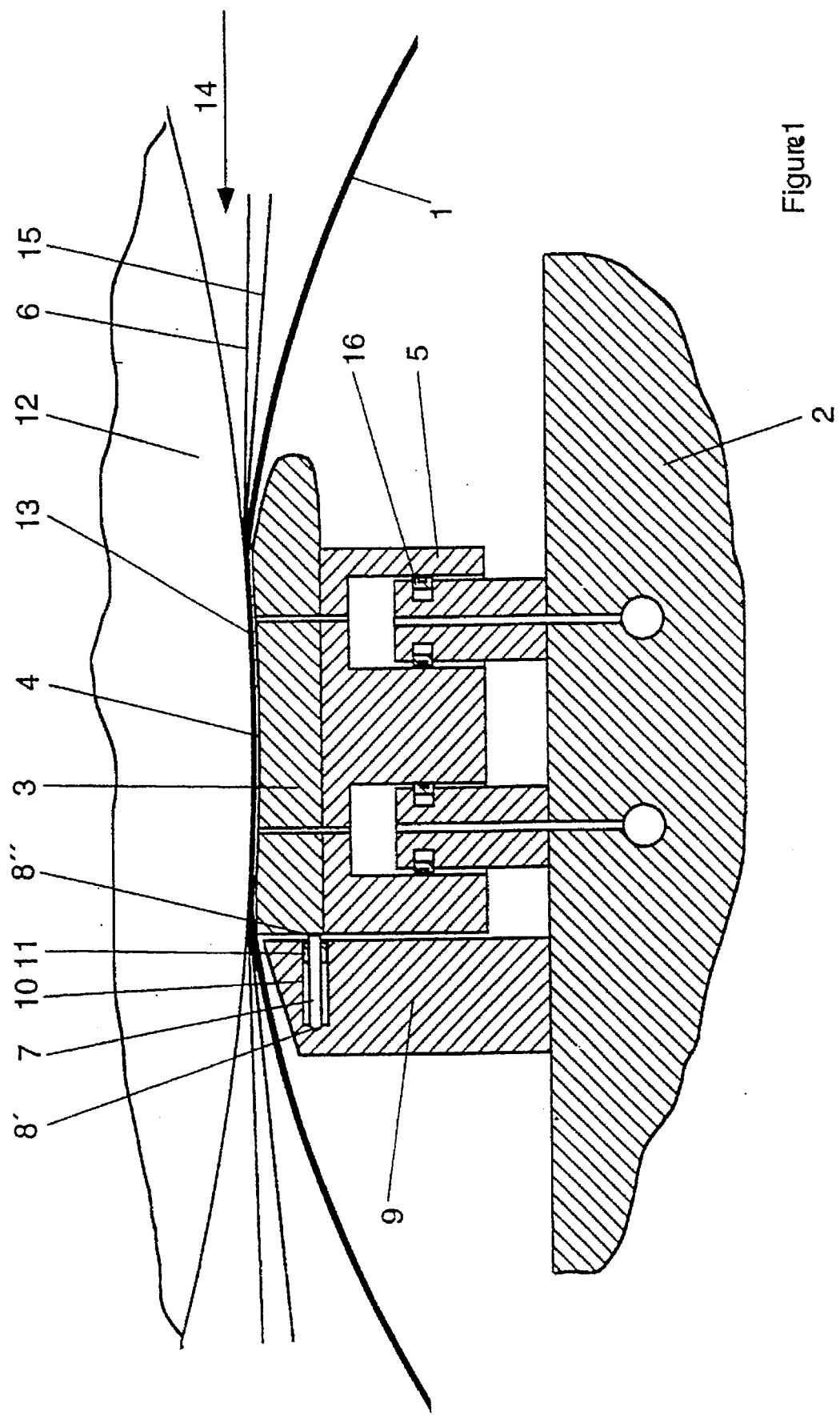
FIG. 1 is a partial sectional view of an embodiment of this invention utilizing a rigid spacer.

With respect to the drawings it is to be understood that only enough of the construction of the invention and the surrounding environment in which the invention is employed have been depicted therein, in order to simplify the illustrations, as needed for those skilled in the art to readily understand the underlying principles and concepts of the invention.

Both embodiments pertain to a device or apparatus for the dewatering or dehydration of a fiber web or band 6 via a pressing roll that provides the dehydration pressure via an elastic pressing gap together with a mating roll 12, wherein the pressing area of surface 4 of the pressing rill is formed by means of a flexible and impervious band moveable in the web moving direction. The fiber web 6 travels together with at least one porous band 15, adapted for the reception of the pressed out water, through the press gap. The roll covering or jacket 1 of the pressing roll, in the form of a band, is pressable against mating or opposing roll 12 via a hydraulic pressing device. For a smoothing operation, only porous band 15 would be deleted.

The pressing device is comprised of at least one support element 3, having a concavely-formed support area or surface 13 and includes at least one contact pressure element 5, acting against press area 4, in the form of a piston-cylinder-unit that is supplied with a hydraulic pressure medium. It is entirely feasible that a plurality of support elements 3 are adjacently arranged, laterally with respect to web-moving direction 14, with supporting elements 3 again utilizing piston-cylinder-units arranged laterally with respect to web-moving direction 14. In the illustrated examples however support is provided only via a strip or ledge-shaped support element 3.

In the FIG. 1 embodiment, support element 3 includes two rows of piston-cylinder-units that are arranged in tandem in web moving direction 14 and are separately supplied with variable pressure via supply conduits located in a carrier 2. The pistons of the piston-cylinder-unit are rigidly connected with the carrier 2 journalled in a seat of the dehydration device. Support element 3, together with the two cylinders attached thereto is displaceably mounted on the piston in the pressing and web moving directions.

Figure 2:
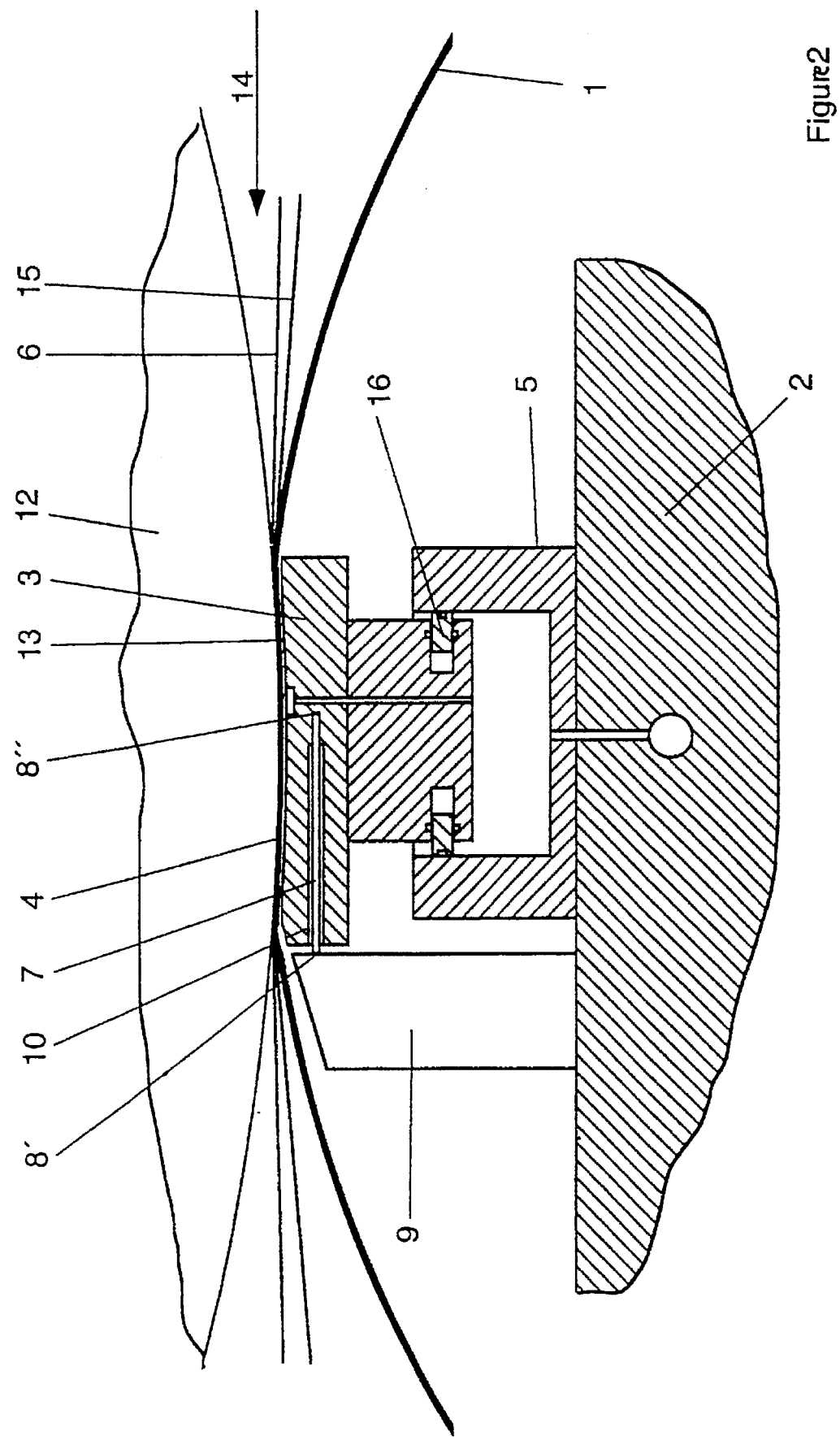
FIG. 2 is a partial sectional view of another embodiment of this invention utilizing an elastic spacer.

In contrast thereto, FIG. 2 illustrates a support element 3 having but one piston-cylinder-unit in web moving direction 14, wherein however here also a plurality of piston-cylinder-units, arranged laterally with respect to web moving direction 14 can be utilized for influencing the pressing pressure profile. In addition, in this embodiment the cylinder is fixedly connected with carrier 2. Correspondingly, support element 3, with the piston attached thereto, is movably received in the cylinder and displaceable in the press and web moving directions.

Sealing of the pressure chamber of the piston-cylinder-unit is achieved, in both instances, via a disc 16 extending laterally relative to the press direction, with disc 16 being movable in the circumferential direction with reference to the piston and being affixed, via the piston, in the press direction. For this purpose, disc 16, which is provided with an aperture, is received with a recess in the piston which permits movement clearance in the circumferential direction. The pressure supply is provided via a supply conduit contained in carrier 2, with the supply conduit being in connection, via an opening in the cylinder and the piston, with the pressure chamber.

For the reason that support element 3, in the circumferential direction and within defined limits, is movable with a relatively small force, it can correspondingly adjust itself relative to mating roll 12. This movement is limited via a stop 9 affixed to carrier 2.

The support or restraint of support element 3, with reference to the force components acting in the circumferential direction is achieved, in both embodiments, via several spacers 7 provided along the pressing roll. Spacers 7, here in rod or bar-shaped form, lead to the determination of support points 8' and 8" and permit a slight radial movement of support element 3 relative to stop 9 during the loaded condition of the support element.

In the FIG. 1 embodiment, spacer 7 is comprised of a rigid material and received in a recess 10 of limit stop 9, with recess 10 having the form of a bore whose diameter is greater than the diameter of rod shaped spacer 7. Spacer 7, having a circular cross section, even in the loaded condition, that is when support element 3 is pressed against press area 4 and subjected to a force in the circumferential direction of the press roll, due to its mobility within the bore, thus assures a radial mobility between support element 3 and limit stop 9. Since the support points, at support element 3 and limit stop 9, do not change, there are no problems due to friction.

In order to achieve a defined position of spacer 7 in the middle of the bore, after the transition from the unloaded to the loaded condition, spacer 7 is, in the region of the bore opening, is substantially centrally retained via a highly elastic adjusting element 11. The support point 8' of spacer 7 in the bore is determined or achieved via a corresponding shape but however permits a swinging or turning of spacer 7.

In the FIG. 2 embodiment, the larger bore for the reception or housing of rod-shaped spacer 7 is located in support element 3. In addition, spacer 7 is also comprised of an elastic material. Due to the retention of one end of spacer 7 in the bore, spacer 7, in the unloaded condition or state, is located at about the axial center of the bore thus assuring the required movement clearance during the loaded state or condition.

In addition, it should be noted that the lubrication of the gap between support element 3 can be accomplished hydrostatically and/or hydrodynamically and that the displacement of support element 3 can also be realized via other constructions, such as for example in the manner set forth in European Patent Publication EP 0 345 501 without impairing the inventive solution of the present invention. The directional notations, radial, axial and circumferential are always with respect to the press roll.

While there are shown and described present preferred embodiments of the invention, it is to be distinctly understood that the invention is not limited thereto, but may be otherwise variously embodied and practiced within the scope of the following claims and the reasonably equivalent structures thereto. Further, the invention illustratively disclosed herein may be practiced in the absence of any element which is not specifically disclosed herein.

What is claimed is:

1. A pressing device in a pressing roll, the pressing roll having a roll jacket, the roll jacket being rotatably arranged about a carrier and journalled via the pressing device, the pressing device comprising:
   at least one support element including at least one supporting pressing element acting in a direction of a pressing area and being supported on the carrier;
   the at least one support element being displaceable in at least one circumferential direction and being radially movable relative to the carrier;
   a limit stop, attached to the carrier, restricting circumferential movement of the at least one support element through at least one spacer having support points on the at least one support element and the limit stop during a loaded condition of the at least one support element;
   one of the support points including a substantially fixed support point associated with one of the limit stop and the at least one support element during both the loaded condition and an unloaded condition of the at least one support element, and the other support point being substantially fixed to the other of the limit stop and the at least one support member during the loaded condition;
   the at least one spacer permitting relative radial movement between the limit stop and the at least one support element during a transition between the unloaded condition and the loaded condition; and
   the at least one spacer, during the loaded condition, permitting at least a minimal relative radial movement between the at least one support element and the limit stop.

2. The pressing device of claim 1, wherein the spacer is received, in part, in a recess in one of the at least one support element and the limit stop, with the recess permitting a movement therewithin of the spacer.

3. The pressing device of claim 1, wherein the spacer is substantially rod-shaped.

4. The pressing device of claim 2, wherein the spacer is substantially rod-shaped.

5. The pressing device of claim 1, wherein the spacer is comprised of a rigid material.

6. The pressing device of claim 2, wherein the spacer is comprised of a rigid material.

7. The pressing device of claim 3, wherein the spacer is comprised of a rigid material.

8. The pressing device of claim 1, wherein the spacer is comprised of an elastic material.

9. The pressing device of claim 2, wherein the spacer is comprised of an elastic material.

10. The pressing device of claim 3, wherein the spacer is comprised of an elastic material.

11. The pressing device of claim 3, wherein the recess is in the form of a bore, with the diameter of the bore being greater than the diameter of the rod-shaped spacer.

12. The pressing device of claim 5, wherein the recess is in the form of a bore, with the diameter of the bore being greater than the diameter of the rod-shaped spacer.

13. The pressing device of claim 7, wherein the recess is in the form of a bore, with the diameter of the bore being greater than the diameter of the rod-shaped spacer.

14. The pressing device of claim 11, wherein the rod-shaped spacer is non-rotatably supported in the recess that serves as the bore.

15. The pressing device of claim 12, wherein the rod-shaped spacer is non-rotatably supported in the recess that serves as the bore.

16. The pressing device of claim 13, wherein the rod-shaped spacer is non-rotatably supported in the recess that serves as the bore.

17. The pressing device of claim 11, wherein the rod-shaped spacer is retained, in a centered manner, via at least one highly elastic adjusting element in the recess, in an unloaded condition.

18. The pressing device of claim 14, wherein the rod-shaped spacer is retained, in a centered manner, via at least one highly elastic adjusting element in the recess, in an unloaded condition.

19. The pressing device of claim 1, wherein the at least one support element has a concavely shaped support area for the formation of an elongated press gap with a circular cylinder mating roll and wherein the roll jacket comprises a flexible, impermeable band.

20. The pressing device of claim 2, wherein the at least one support element has a concavely shaped support area for the formation of an elongated press gap with a circular cylinder mating roll and wherein the roll jacket comprises a flexible, impermeable band.

21. The pressing device of claim 3, wherein the at least one support element has a concavely shaped support area for the formation of an elongated press gap with a circular cylinder mating roll and wherein the roll jacket comprises a flexible, impermeable band.

22. The pressing device of claim 5, wherein the at least one support element has a concavely shaped support area for the formation of an elongated press gap with a circular cylinder mating roll and wherein the roll jacket comprises a flexible, impermeable band.

23. The pressing device of claim 8, wherein the at least one support element has a concavely shaped support area for the formation of an elongated press gap with a circular cylinder mating roll and wherein the roll jacket comprises a flexible, impermeable band.

24. The pressing device of claim 11, wherein the at least one support element has a concavely shaped support area for the formation of an elongated press gap with a circular cylinder mating roll and wherein the roll jacket comprises a flexible, impermeable band.

25. The pressing device of claim 14, wherein the at least one support element has a concavely shaped support area for the formation of an elongated press gap with a circular cylinder mating roll and wherein the roll jacket comprises a flexible, impermeable band.

26. The pressing device of claim 17, wherein the at least one support element has a concavely shaped support area for the formation of an elongated press gap with a circular cylinder mating roll and wherein the roll jacket comprises a flexible, impermeable band.

27. The pressing device of claim 19, wherein the at least one support element, in the axial direction, is strip-shaped and is supported by a plurality of pressing elements.

\* \* \* \* \*